(12) United States Patent
Tu et al.

(10) Patent No.: US 8,430,367 B2
(45) Date of Patent: Apr. 30, 2013

(54) MOUNTING DEVICE FOR DATA STORAGE DEVICES

(75) Inventors: Chen-Ruei Tu, Tu-Cheng (TW); Li-Ping Chen, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 162 days.

(21) Appl. No.: 13/013,747

(22) Filed: Jan. 25, 2011

(65) Prior Publication Data

US 2012/0018606 A1 Jan. 26, 2012

(30) Foreign Application Priority Data

Jul. 22, 2010 (CN) .......................... 2010 1 0233881

(51) Int. Cl.
*H05K 5/00* (2006.01)

(52) U.S. Cl.
USPC ............... 248/220.21; 312/223.1; 361/679.02

(58) Field of Classification Search ............. 248/220.21, 248/221.11, 222.11, 918, 27.3, 27.1; 312/223.1, 312/223.2; 361/679.02, 679.31, 679.32, 361/679.33, 679.37, 679.4, 679.41

See application file for complete search history.

(56) References Cited

U.S. PATENT DOCUMENTS

| | | | | |
|---|---|---|---|---|
| 5,195,022 A * | 3/1993 | Hoppal et al. | ........... | 361/679.37 |
| 5,333,098 A * | 7/1994 | DeLuca et al. | ........... | 361/679.34 |
| 6,392,879 B1 * | 5/2002 | Chien | ....................... | 361/679.33 |
| 8,189,340 B2 * | 5/2012 | Howard et al. | ............... | 361/752 |
| 2010/0172082 A1 * | 7/2010 | Chen et al. | ............... | 361/679.31 |
| 2011/0102999 A1 * | 5/2011 | Liu et al. | ................... | 361/679.33 |
| 2011/0211304 A1 * | 9/2011 | Chen | ....................... | 361/679.02 |

\* cited by examiner

*Primary Examiner* — Terrell McKinnon
*Assistant Examiner* — Steven Marsh
(74) *Attorney, Agent, or Firm* — Altis Law Group, Inc.

(57) ABSTRACT

A mounting device for data storage devices includes a mounting bracket, a first tray mounted to the mounting bracket, a second tray mounted to the mounting bracket, a first cable, and a cable retainer. The first cable is located on the first tray. The first cable extends through the first tray and toward the second tray. The cable retainer is mounted to the first tray adjacent the second tray for retaining the first cable.

16 Claims, 5 Drawing Sheets

MOUNTING DEVICE FOR DATA STORAGE DEVICES

BACKGROUND

1. Technical Field

The present disclosure relates to mounting devices, and more particularly to a mounting device for mounting data storage devices.

2. Description of Related Art

Often, a number of data storage devices are mounted in a computer. These data storage devices are connected to a motherboard of the computer via cables. For ease of installation, the cables will be longer than actually needed. However this will create a surplus of cables that do nothing more than occupy precious space in a disorderly manner within the computer.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
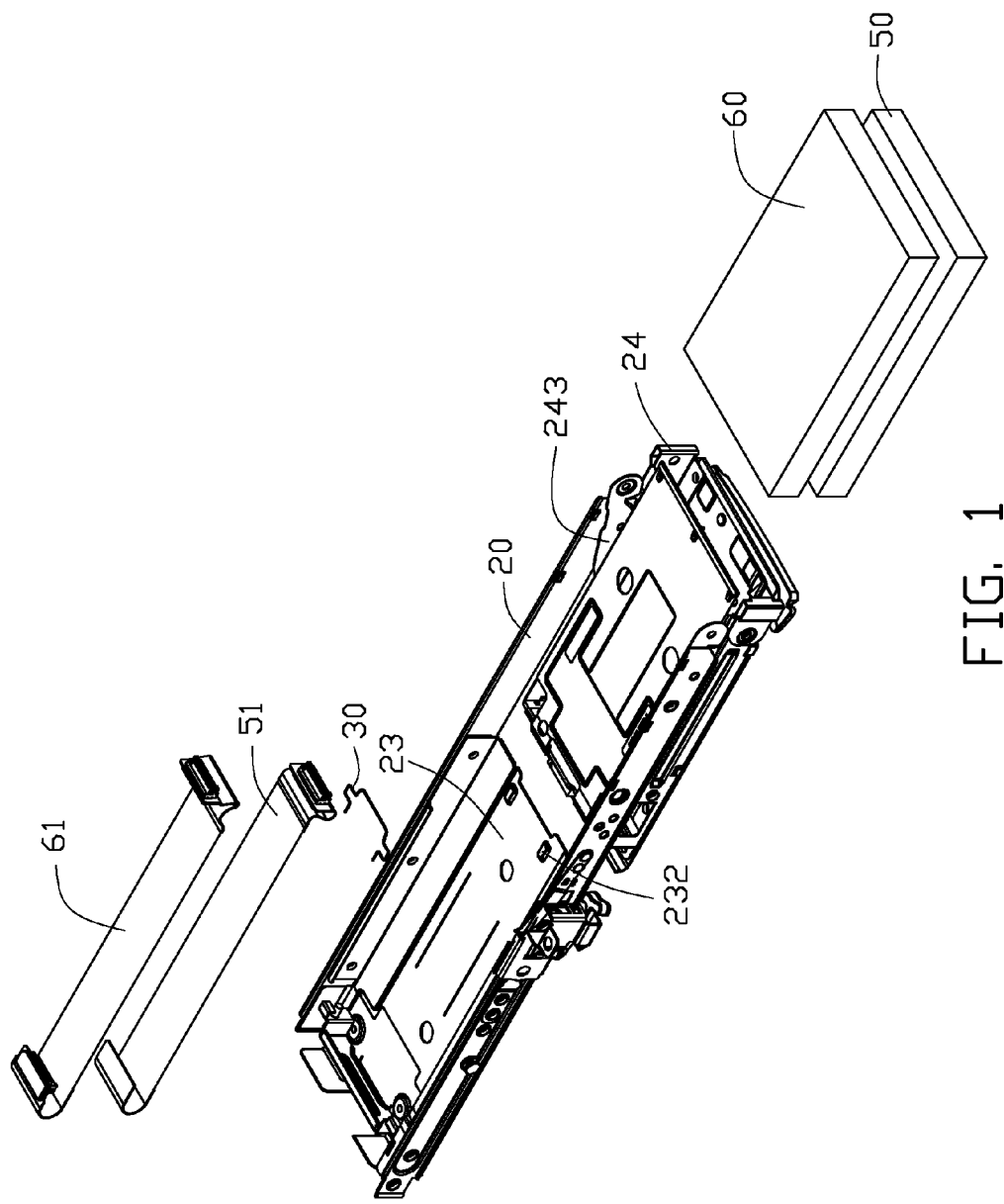
FIG. 1 is an exploded, isometric view of an embodiment of a mounting device for a data storage device.

Referring to FIG. 1, one embodiment of a mounting device for mounting data storage devices includes a mounting bracket 20, a first tray 23, a second tray 24, a first cable 51, a second cable 61, and a cable retainer 30.

The first tray 23 and the second tray 24 are mounted to the mounting bracket 20 for receiving a first data storage device 50 and a second data storage device 60. The mounting bracket 20 can receive the first tray 23 and the second tray 24 along a lengthwise direction.

In one embodiment, the first tray 23 has a U-shaped configuration in cross section, and is directly mounted to the mounting bracket 20. Two bridges 232 are oppositely located on the first tray 23.

In one embodiment, the second tray 24 is mounted to the mounting bracket 20 via two connecting arms 243. Each arm 243 is pivotably mounted to the mounting bracket 20 at one end, and is pivotably mounted to the second tray 24 at the other end. In this way, the second tray 24 can be lifted into or lowered out of the mounting bracket 20.

Figure 2:
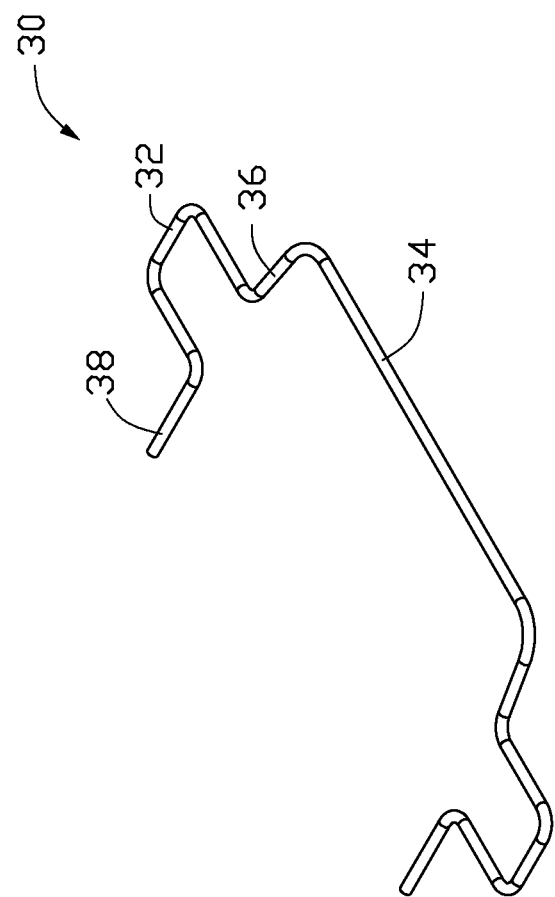
FIG. 2 is an isometric view of a cable retainer of FIG. 1.

Referring to FIG. 2, in one embodiment, the cable retainer 30 can be made of metal. The cable retainer 30 is string shaped. The cable retainer 30 includes a straight holding portion 34, two U-shaped retaining portions 32, two resilient connecting portions 36 connecting the retaining portions 32 to the holding portion 34, and two operating portions 38 located at two ends of the two retaining portions 32.

In one embodiment, the first cable 51 and the second cable 61 are belt cables. The first cable 51 can be located on the first tray 23 along a lengthwise direction. The second cable 61 can be located on top of the first cable 51. The second cable 61 at least partially overlaps the first cable 51.

Figure 3:
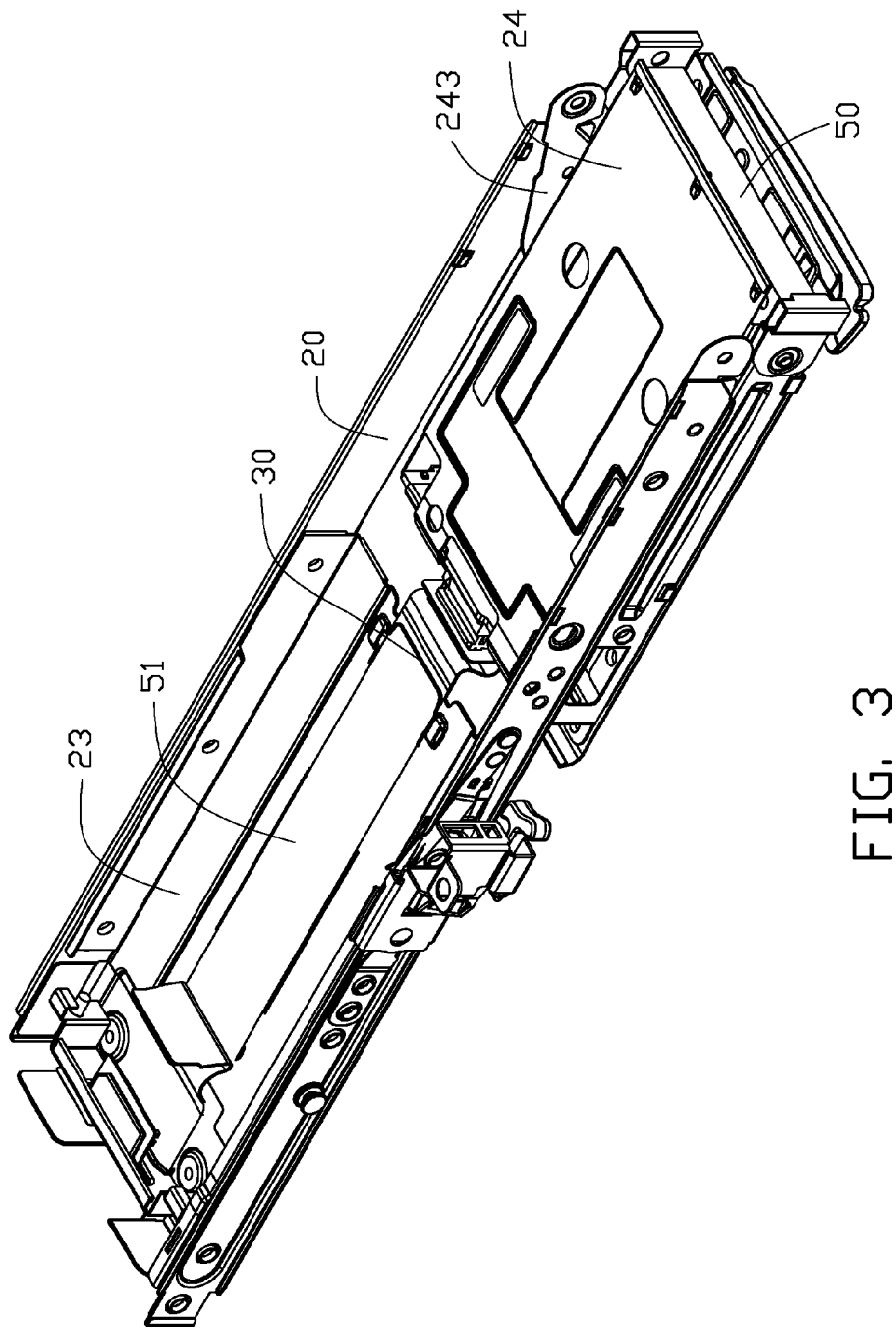
FIG. 3 is an assembled view of a mounting bracket, a first tray, a second tray, a first data storage device, and a first cable.

Referring to FIG. 3, in assembly, the first tray 23 and the second tray 24 are mounted to the mounting bracket 20. The second tray 24 is lowered from the mounting bracket 20. The first data storage device 50 is mounted into the second tray 24. The first cable 51 is positioned on the first tray 23 and extends from one side to the other side of the first tray 23 towards the second tray 24. An end of first cable 51 is connected to the first data storage device 50. The cable retainer 30 is resiliently mounted to the first tray 23 with the two retaining portions 32 engaged into the corresponding bridges 232. The holding portion 34 holds the first cable 51 to the first tray 23.

Figure 4:
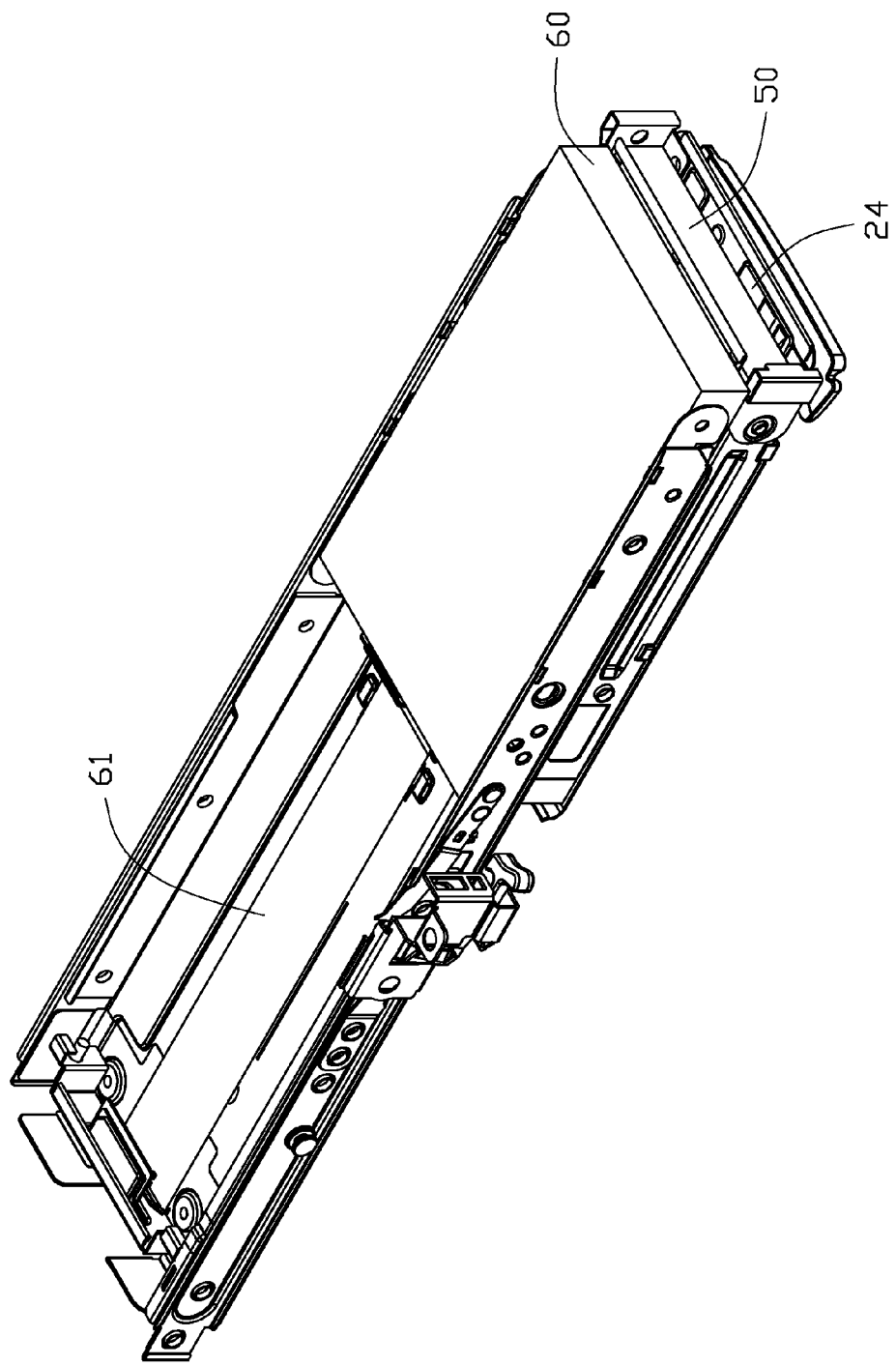
FIG. 4 is similar to FIG. 3, but a second data storage device and a second cable are assembled.
Figure 5:
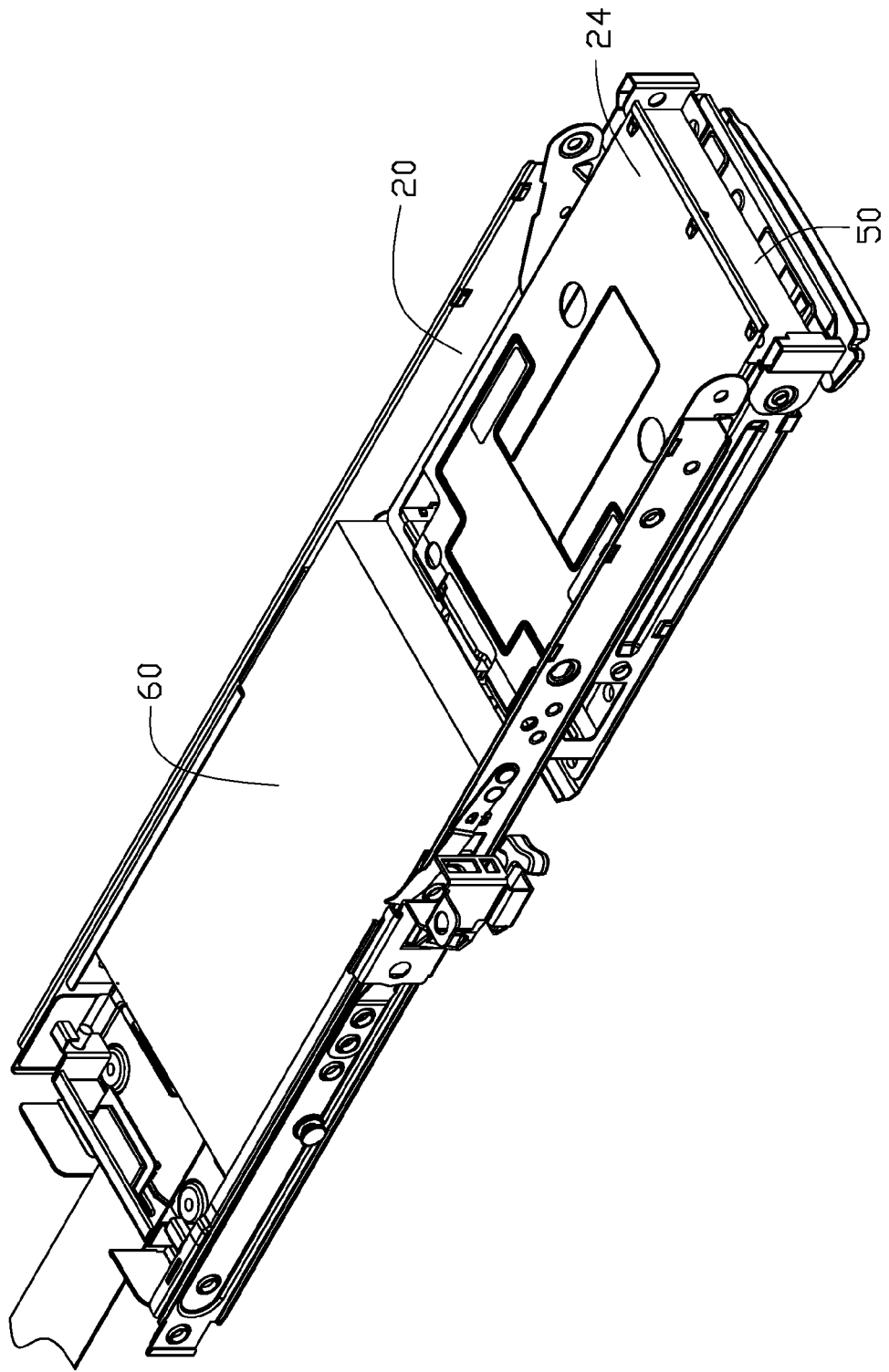
FIG. 5 is an assembled view of FIG. 1.

Referring to the FIG. 4 and FIG. 5, the second data storage device 60 is positioned on top of the second tray 24. The second tray 24 is aligned with the first tray 23 along the lengthwise direction of the mounting bracket 20. The second cable 61 is positioned on top of the first cable 51 and is connected to the second data storage device 60. The second data storage device 60 is moved into the first tray 23. The second cable 61 is curled to prevent being disturbed by the retained first cable 51. The second tray 24 can then lifted into the mounting bracket 20.

In one embodiment, the cable retainer 30 can be removably mounted to the first tray 23 to stably retain the first cable 51. The cable retainer 30 also takes little space in the mounting device to retain the first cable 51.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting device for data storage devices, comprising:
   a mounting bracket;
   a first tray mounted to the mounting bracket;
   a second tray mounted to the mounting bracket;
   a first cable located on the first tray and extending through the first tray and towards the second tray; and
   a cable retainer mounted to the first tray adjacent the second tray for retaining the first cable, wherein the cable retainer is resiliently mounted to the first tray, two bridges are located on the first tray, and the cable retainer comprises two U-shaped retaining portions removably mounted to the two bridges.

2. The mounting device of claim 1, wherein the cable retainer is made of metal, and the cable retainer is string shaped.

3. The mounting device of claim 1, wherein the cable retainer further comprises a straight holding portion connected to the two U-shaped retaining portions for retaining the first cable.

4. The mounting device of claim 1 further comprising a second cable located on top of the first cable, wherein the second cable at least partially overlaps the first cable.

5. The mounting device of claim 1, wherein two connecting arms are connected between the second tray and the mounting bracket for lifting the second tray relative to the first tray.

6. The mounting device of claim 1, wherein the first cable is belt cable.

7. The mounting device of claim 1, wherein the first cable extends along a first direction, and the first tray and the second tray are aligned along the first direction.

8. The mounting device of claim 1, wherein the first cable and the cable retainer are configured for being located between the first tray and a data storage device.

9. Amounting device, comprising:
a mounting bracket;
a first tray mounted to the mounting bracket;
a first cable located on the first tray;
a cable retainer mounted to the first tray for retaining the first cable; and
a second cable located on top of the first cable, wherein the second cable at least partially overlaps the first cable, wherein the cable retainer is resiliently mounted to the first tray, two bridges are located on the first tray, and the cable retainer comprises two U-shaped retaining portions removably mounted to the two bridges.

10. The mounting device of claim 9, wherein the cable retainer is made of metal, and the cable retainer is string shaped.

11. The mounting device of claim 9, wherein the cable retainer further comprises a straight holding portion connected to the two U-shaped retaining portions for retaining the first cable.

12. The mounting device of claim 9 further comprising a second tray mounted to the mounting bracket, wherein the first cable and the second cable extend to the second tray.

13. The mounting device of claim 12, wherein two connecting arms are connected between the second tray and the mounting bracket for lifting the second tray relative to the first tray.

14. The mounting device of claim 12, wherein the first cable extends along a first direction, and the first tray and the second tray are aligned along the first direction.

15. The mounting device of claim 12, wherein the first cable and the cable retainer are configured for being located between the first tray and a data storage device.

16. The mounting device of claim 9, wherein the first cable and the second cable are belt cables.

* * * * *